Figure 33:
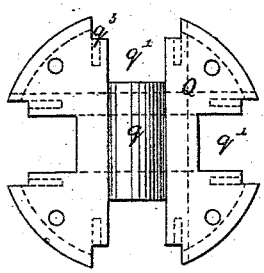
Figure 34:
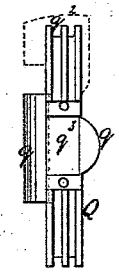
Figure 38:
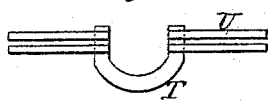
Figure 39:
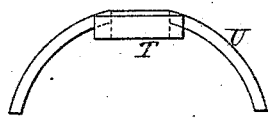
Figure 37:
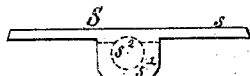
Figure 36:
Figure 35:
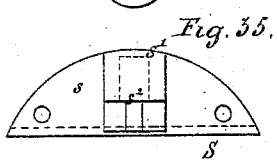

(No Model.) 6 Sheets—Sheet 1.
R. H. FROUDE.
ROTARY ENGINE AND PUMP.
No. 295,380. Patented Mar. 18, 1884.
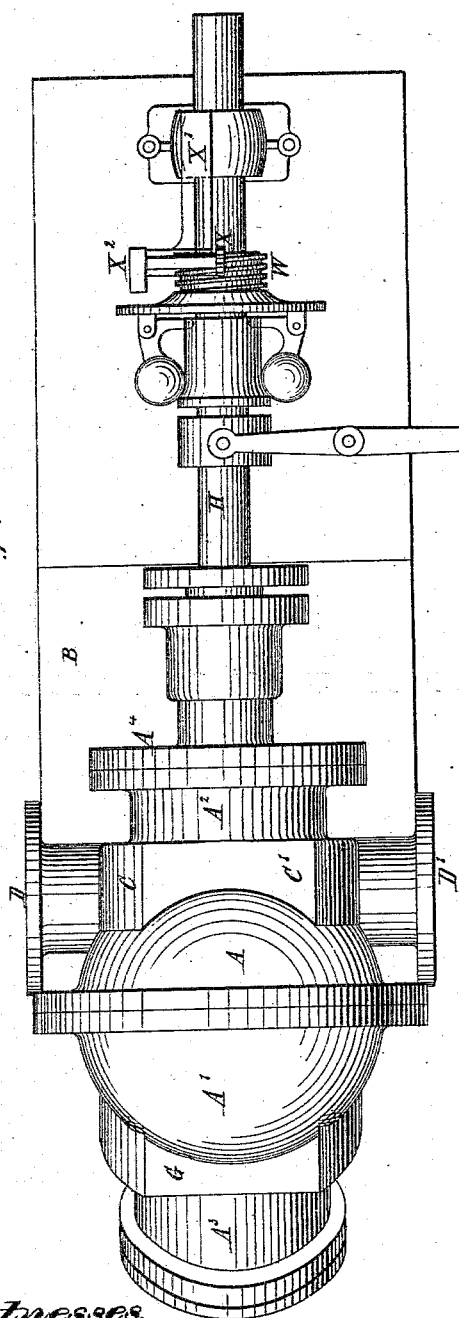
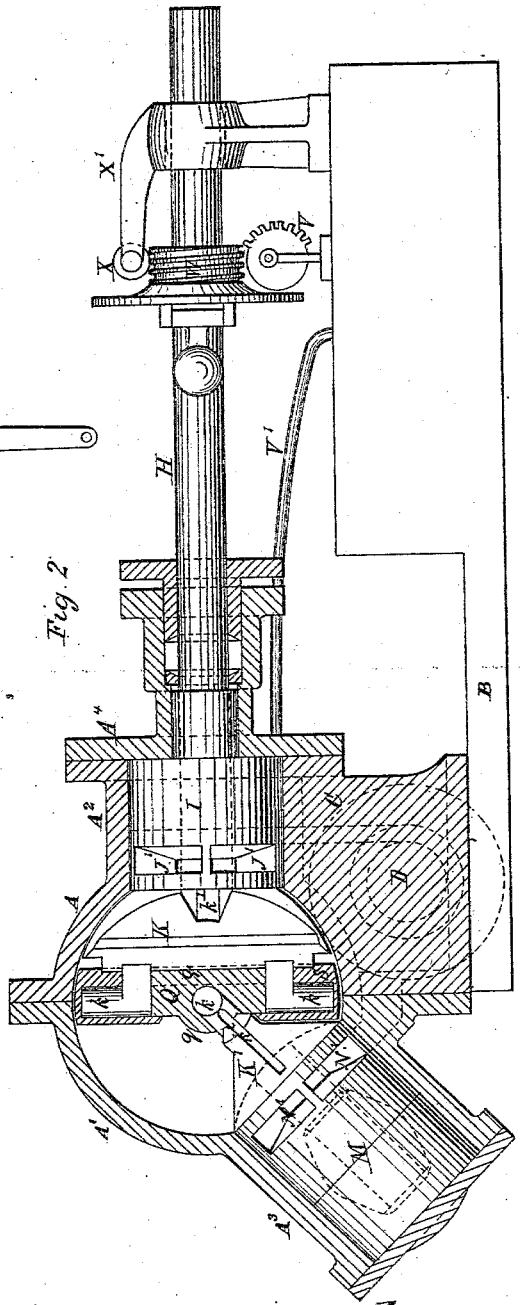
Witnesses.
J. A. Rutherford
Robert Everett
Inventor.
Richard H. Froude.
By James L. Norris, Atty.

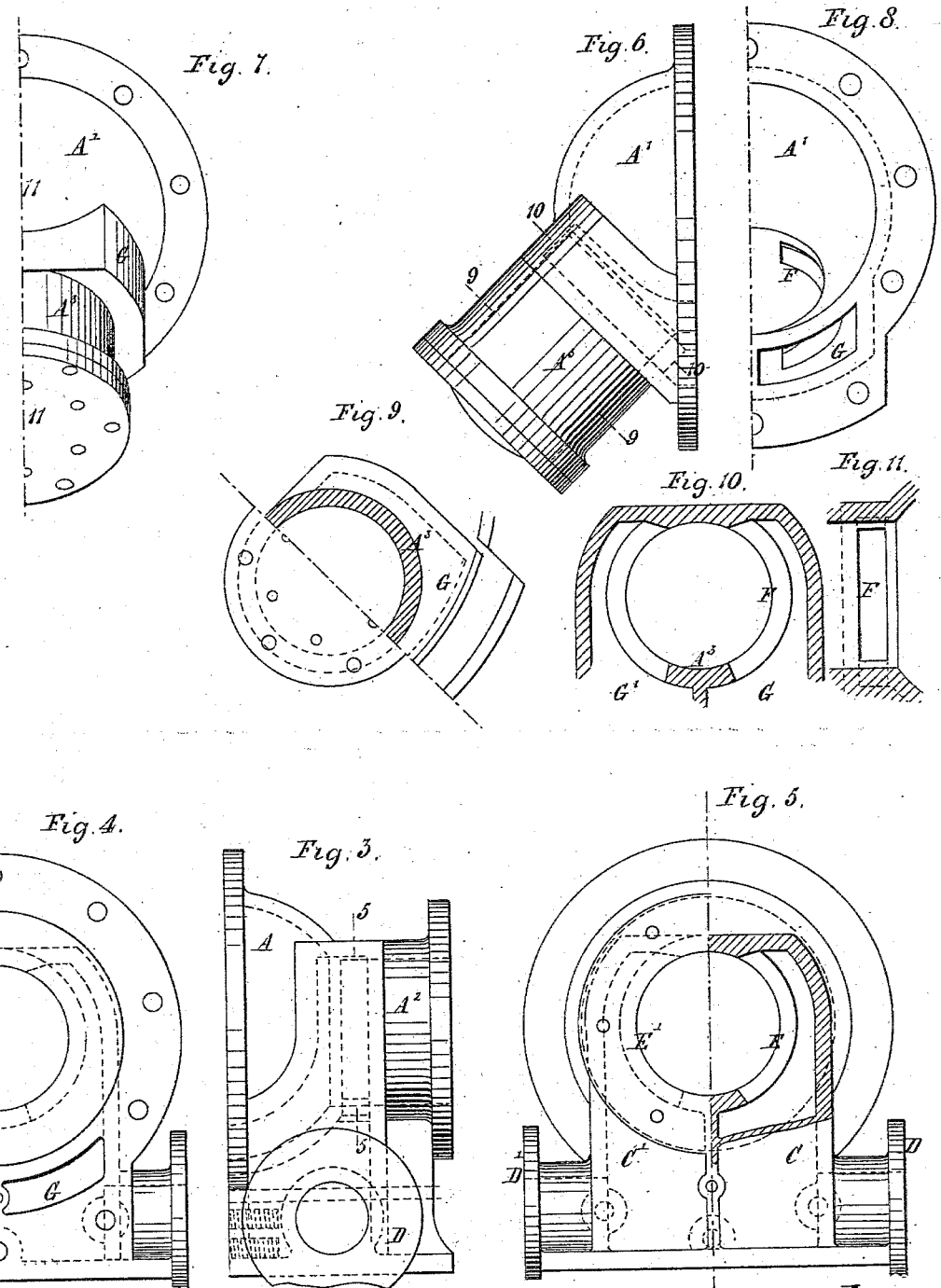

(No Model.) 6 Sheets—Sheet 3.
R. H. FROUDE.
ROTARY ENGINE AND PUMP.
No. 295,380. Patented Mar. 18, 1884.
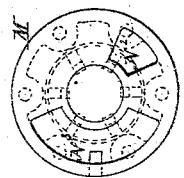
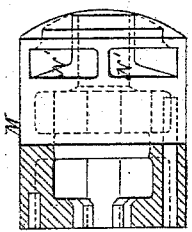
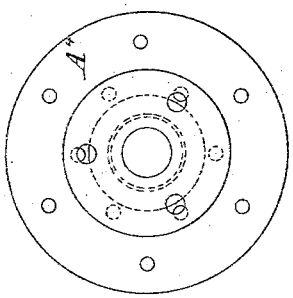
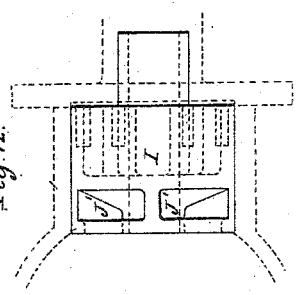
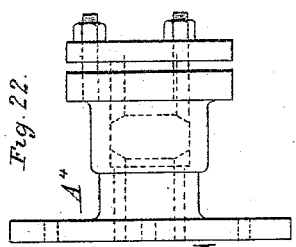
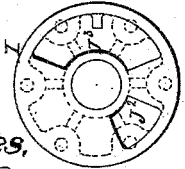
Witnesses,
J. A. Rutherford
Robert Everett
Inventor,
Richard H. Froude
By James L. Norris. Atty.

(No Model.) 6 Sheets—Sheet 4.
R. H. FROUDE.
ROTARY ENGINE AND PUMP.
No. 295,380. Patented Mar. 18, 1884.
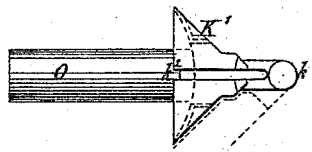
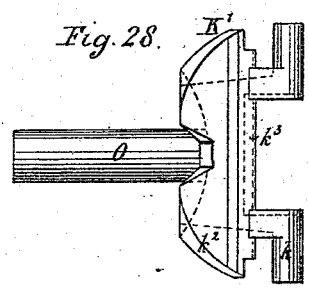 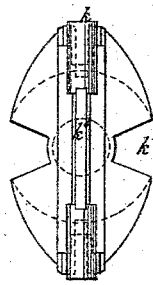
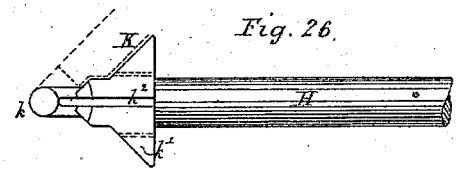
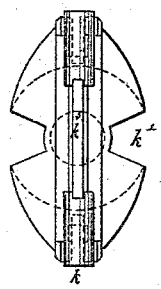 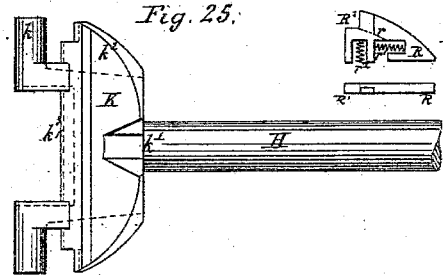
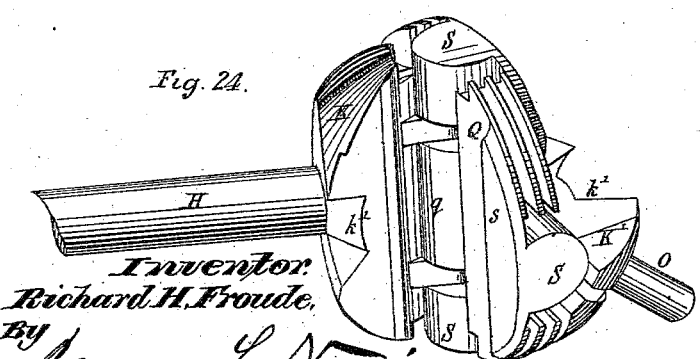
Witnesses.
J. A. Rutherford
Abt Everett
Inventor:
Richard H. Froude,
By James L. Norris,
Atty.

(No Model.)  6 Sheets—Sheet 5.

R. H. FROUDE.
ROTARY ENGINE AND PUMP.

No. 295,380.  Patented Mar. 18, 1884.

Witnesses.
J. A. Rutherford
Robert Everett

Inventor.
Richard H. Froude,
By James L. Norris.
Atty.

(No Model.) 6 Sheets—Sheet 6.

R. H. FROUDE.
ROTARY ENGINE AND PUMP.

No. 295,380. Patented Mar. 18, 1884.

Witnesses.
J. A. Rutherford
Robert Everett

Inventor:
Richard H. Froude.
By James L. Norris
Atty.

UNITED STATES PATENT OFFICE.

RICHARD H. FROUDE, OF KENSINGTON, COUNTY OF MIDDLESEX, ENGLAND.

ROTARY ENGINE AND PUMP.

SPECIFICATION forming part of Letters Patent No. 295,380, dated March 18, 1884.

Application filed September 20, 1883. (No model.)

*To all whom it may concern:*

Be it known that I, RICHARD HURRELL FROUDE, a citizen of England, residing at Kensington, in the county of Middlesex, England, have invented an Improved Construction of Rotary Engines and Pumps, of which the following is a specification.

My invention has reference to the class of rotary engines and pumps for which British Letters Patent were granted to B. Tower, dated October 2, 1879, No. 3,953, and United States Letters Patent to George Murray, Jr., No. 221,599. My improved construction of such engines will be readily understood on reference to the accompanying drawings, in which—

Figure 1 shows a plan of the complete engine, and Fig. 2 a longitudinal section of the same, while Figs. 3 to 42 show detached details.

The spherical casing A A', instead of being divided in halves on the axial plane of the driving-shaft, is divided at right angles to such axial plane, the part A, through which the driving-shaft passes, being bolted to the bed-plate B, while the part A', carrying the dummy-shaft, is bolted to A. The part A is formed with steam and exhaust chests C C'. (Shown more clearly in the detached views of the half-casing at Figs. 3, 4, and 5, in which Fig. 3 shows a side view; Fig. 4, a part front end view, and Fig. 5 a back end view, partly in section on line 5 5, Fig. 3.) These chests communicate, first, with the steam and exhaust pipes by branches D D', and, secondly, with the interior of the cylindrical extension A² of A by ports E E'. The chests C C' also communicate with the ports F F' in the cylindrical extension A³ of the half-casing A' by means of passages G G', formed partly in A and partly in A'. The part A' is shown detached in Figs. 6 to 11, in which Fig. 6 shows a side view, Fig. 7 a part front view, and Fig. 8 a part back view, while Figs. 9, 10, and 11 show sections taken, respectively, on lines 9 9, 10 10, and 11 11.

The cylindrical extension A² of A is closed at its outer end by a cover and stuffing-box, A⁴, (shown in side and end view at Figs. 22 and 23,) through which the engine-shaft H passes, and it has fitted accurately within it a cylinder, I, (shown detached in side and end views at Figs. 12 and 13,) in which are formed passages J J', having ports at the sides corresponding with the ports E E' of the casing, and also ports J² J³ on the flat inner face, which fits against the circular flat face of the main blade K, to be presently described, these circular flat faces being made to correspond with the plane of intersection of the interior of the cylinder A² with that of the sphere A. Thus the steam passing from the steam-chest C will find its way through the passage J and port J² into the spherical casing whenever the port is uncovered by the notches k' of the blade K, and the exhaust will in like manner pass from A through port J³, passage J', and exhaust-chest C'. The flat face of blade K, with its notches, consequently acts as valve-face relatively to the ports J² J³, and the two faces are kept in close contact, either by means of push-screws L, Fig. 14, screwing through the cylinder-cover and pressing I against the valve-face, pull-screws L', Fig. 15, being provided to lock the cylinder I, or springs may be provided between I and the cylinder-cover for the purpose, or steam-pressure may be employed, or, again, liners and pull-back screws may be used.

The cylindrical extension A³ of A' is similarly provided with a cylinder, M. (Shown detached in part sectional side view at Fig. 17, in end view at Fig. 18, and in part section at right angles to Fig. 17 at Fig. 19.) In this cylinder are formed steam and exhaust passages N N', having side apertures corresponding with the ports F F' of the casing, and having ports N² N³ on the inner face of the cylinder, which bears against the face of the blade K'. These faces are not made flat, as is the case with K and I, but convex and concave, and the hole through which the "dummy-shaft" O passes is provided with a barrel-shaped bush, P, (shown in side and end view at Figs. 20 and 21,) introduced into a recess therein by separating the two halves of which the cylinder M is formed. The object of forming the meeting surfaces of M and K' spherical and providing the bush P is to allow the dummy-shaft O to adapt itself to deviations caused by the elasticity of the engine-shaft or imperfections of workmanship, and to prevent any imperfect contact between the meeting faces of M and K' in consequence of such deviations. The surface of K', with its notches k' working against M, acts as a valve-face, similarly to K, for alternately admitting steam to the spherical casing and exhausting it therefrom through the ports $N^2$ $N^3$. The cylinder M is for this purpose kept steam-tight against K' by push-screws L, Fig. 14, and is locked by pull-screws $L^2$, Fig. 16. The piston Q and blades K K', with engine-shaft H and dummy-shaft O, are shown combined in perspective at Fig. 24, and detached at Figs. 25 to 30.

Figs. 25, 26, and 27, show, respectively, a side view, a plan, and an end view of the blade K, and Figs. 28, 29, and 30 show similar views of the blade K'. The blade K and shaft H, as also the blade K' and shaft O, are each made of one solid piece of steel, the blades having their sides beveled, as shown, to correspond with the inclinations of the piston Q in the one direction and the other during its revolution. The blades have projecting trunnion-pins $k$, forming the cross-axes of the movement, which trunnions fit into brasses S, attached to the piston Q. The blades have, furthermore, notches $k'$ on each side, which, as the blades revolve, come respectively opposite the ports $J^2$ $J^3$ and $N^2$ $N^3$, so as to put the spaces between the blades and the piston alternately in communication with the steam supply and the exhaust. The blades are made to work steam-tight against the spherical casing by means of packing-pieces R R', (shown in side and end view at Figs. 31 and 32,) which fit into deep grooves in the blade. The parts R R' overlap each other, as shown, and slide upon each other with curved surfaces at $r$, so that while R is pressed outward by a spring at $r'$ and R' is pressed in a direction at right angles thereto by a spring at $r^2$ their outer packing-edges will always form a continuous circular curvature. The part R' fits with its notched surface against the packing-piece T for the brasses S of the trunnions $k$. The blades K K' have, furthermore, grooves at $k^3$, into which are fitted packing-pieces working against the cylindrical parts $q$, formed on the piston Q. This piston, which is shown detached in front and side view at Figs. 33 and 34, has four gaps, $q'$, into which fit the before-mentioned brasses S. (Shown in front view, side view, and end view at Figs. 35, 36, and 37.) These brasses consist of a plate, $s$, which is secured by screws to the piston itself, and of a cylindrical part, $s'$, formed on the plate, and fitting with flat sides into the gaps $q'$. The axes of the holes $s^2$ of the brasses coincide with the central cross-axes of the piston itself. The piston is made to work steam-tight against the spherical surface of the casing by means of curved packing-pieces U, Figs. 38 and 39, fitting into grooves formed on the edge of the piston, while horseshoe packing-pieces T fit round the bearings S. Small springs in recesses at $q^3$ in the piston press these pieces T outward, and the pieces U, being notched into the pieces T, are consequently also pressed outward thereby.

The action of the engine is the same as described in the before-mentioned patents. As one of the notches $k$ of the blades K K' passes, respectively, over the ports $J^2$ and $N^2$ steam will be admitted to those chambers between the blades and piston, which for the time being are enlarging, the pressure of the steam effecting such enlargement, and thereby producing the rotation of the engine-shaft. When the notch $k$ has passed the edge of the port, expansion will take place, until by the rotation of the blade the notch $k$ is brought opposite the exhaust-port $J^3$ or $N^3$, whereupon the chamber will be exhausted.

Figure 41:
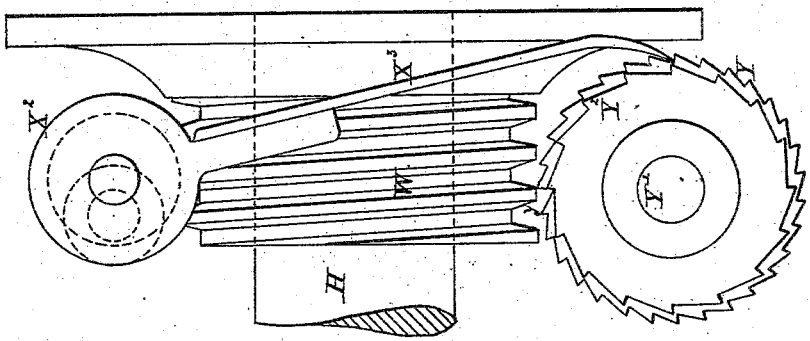
Figure 42:
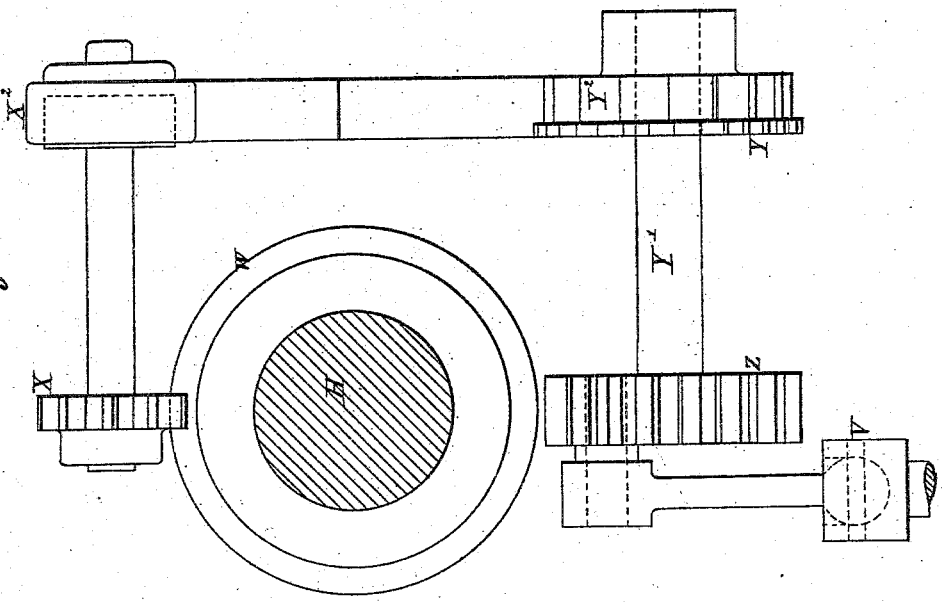
Figure 40:
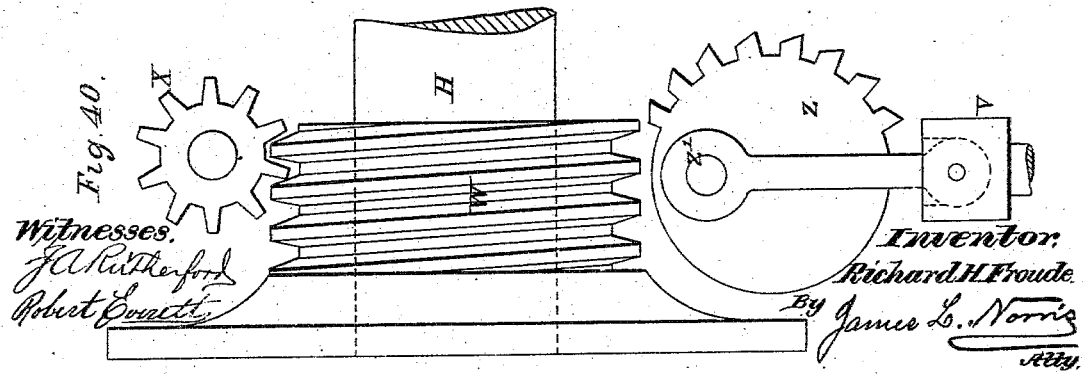

Figs. 40 to 42 show to an enlarged scale the arrangement which I employ for automatically lubricating the working parts of the engine. Figs. 40 and 41 show opposite side views, and Fig. 42 a front view. This arrangement has for its object to enable the rapidly-revolving engine-shaft H to impart to the plunger V of the lubricating-pump a slow and intermittent movement while the pump is drawing in a charge of lubricant, and a more rapid movement while it is discharging, so that a jet of lubricant can be directed onto the rubbing-surfaces even in opposition to high fluid-pressure. For this purpose a worm, W, is formed or fixed on the shaft H, in gear with which is a worm-wheel, X, on a spindle carried by a bracket, X', Fig. 2, which spindle carries an eccentric, $X^2$, working a pawl, $X^3$. This pawl is in gear with a ratchet-wheel, Y, loose on a spindle, Y', on which is fixed a second ratchet-wheel, $Y^2$, of smaller diameter than Y and having in its circumference about half the number of teeth which Y has. Thus the pawl $X^3$ is made to turn the ratchet-wheel Y completely round before the deep tooth $y$ of the latter allows it to come in gear with the ratchet-wheel $Y^2$, so as to turn this one tooth. Thus a very slow step-by-step motion is imparted to the spindle Y' from the rapidly-revolving engine-shaft H. On the spindle $Y^2$ is fixed a wheel, Z, having teeth on part of its circumference only, which teeth are made to gear with the worm W after the spindle Y' has been turned round to an extent corresponding with the space on the wheel Z, on which there are no teeth. The wheel Z has a crank-pin, Z', connected by a link to the plunger V of the lubricating-pump. Thus it will be seen that after the spindle $Y^2$ has been moved round very slowly through part of its revolution by the pawl and ratchet-wheels the teeth of Z, in coming in gear with the worm W, will cause the crank-pin to turn rapidly during the remainder of the revolution, and this movement being made to effect the instroke of the plunger the lubricant will be forced by the pump V through the pipe V' and suitable passages to the moving parts of the engine.

Having thus described the nature of my invention and in what manner the same is to be performed, I claim—

1. The casing A A', divided transversely to the axial line of the engine-shaft, having cylindrical extensions $A^2$ $A^3$, with steam and exhaust chests C C', ports E E' F F', and passages G G', arranged and operating substantially as herein described.

2. The cylinder I, having steam and exhaust passages J J' and ports $J^2 J^3$, and pressed by screws L L' or equivalent devices against the flat face of the blade K, substantially as described.

3. The round-ended cylinder M, having passages N N' and ports $N^2 N^3$, and pressed by screws L $L^2$ or equivalent devices against the concave face of the blade K', substantially as described.

4. In combination with the divided cylinder M, the barrel-shaped bush P, through which the dummy-shaft O passes, for allowing a certain amount of lateral play of the shaft in the cylinder, substantially as described.

5. The blades K K', with notches $k'$, operating, in combination with the ports $J^2 J^3 N^2 N^3$, for alternately putting the spaces in the casing A A' in communication with the steam and exhaust.

6. The blades K K', with trunnion-pins $k$ formed in one piece therewith, in combination with the disk or piston Q, having separate brasses S, for receiving the trunnion-pins fixed in gaps $q'$ therein, substantially as herein described.

7. In combination with the blades K K' and piston Q, the packing-pieces R R', T, and U, arranged and operating substantially as herein described.

8. The combination of the dummy O, provided with the blade K', the shaft H, provided with the blade K, a worm on said shaft, a wheel having teeth on part of its circumference for gearing with the worm, a pump for supplying a lubricant to said parts, a crank-pin for imparting motion to said pump, and a pawl-and-ratchet connection between said wheel and crank-pin, whereby the said pump will be operated to supply a lubricant to said parts, substantially as and for the purpose set forth.

In testimony whereof I have signed my name to this specification, in the presence of two subscribing witnesses, this 5th day of September, A. D. 1883.

R. H. FROUDE.

Witnesses:
OLIVER IMRAY,
DANIEL ROGERS.